2,712,499
COATED CEREAL PRODUCTS AND PROCESS FOR PREPARING THE SAME

Raymond La Pierre, Iselin, N. J., assignor to Merck & Co., Inc., Rahway, N. J., a corporation of New Jersey No Drawing. Application September 5, 1952, Serial No. 308,137

17 Claims. (Cl. 99—11)

This invention relates to the coating of cereal products and particularly to a new coating and coating procedure for vitamin enriched rice. More particularly, the invention relates to a new coating for vitamin enriched cereal products of a granular or particled nature, such as rice, corn grits, farina, and the like, which imparts to the particles or granules thereof a white color making them substantially indistinguishable from unenriched products of commerce. The present application is a continuation-in-part of my pending application Serial No. 285,791, filed May 2, 1952, now abandoned.

The refining of whole rice to produce the white rice of commerce eliminates the bran and germ which contain most of the vitamins normally present in the whole rice. For this reason, the white rice which is the preferred commercial product, and is extensively used as a primary food by rice eating peoples, is grossly deficient in many essential vitamins and minerals, some of the most important of these being niacin, thiamine, riboflavin, and iron. It is highly desirable, therefore, that rice be enriched with these vitamins which are needed for a complete nutritional diet and for the prevention of disease, especially in countries where rice is the major food consumed.

Other granular or particled cereal products, as normally prepared in commerce, are likewise deficient in essential vitamins and minerals. Thus, for example, corn grits or hominy grits are prepared by grinding cleaned white corn with removal of the bran and germ (which contain the vitamins and minerals) and sifting the ground corn to obtain a product of which 95% or more will pass through a No. 10 sieve, but not more than 20% will pass through a No. 25 sieve. Another such product, farina, consists of coarsely ground uniform-sized particles of highly purified fragments of the endosperm of wheat, the granulation being such that it will pass through a No. 20 sieve, but not more than 3% will pass through a No. 100 sieve. Here again bran and germ, which contain the bulk of the minerals and vitamins, are removed.

In recent years, a number of procedures have been developed for supplying the missing vitamins and minerals in the form of enriched granular cereal products. These procedures generally include the application of coatings to individual granules or particles in which the vitamins and minerals are bonded to the granules by one or more films of zein (a corn protein), shellac or similar film forming materials of non-deleterious character.

Rather than enriching all of the granules, it has been the practice to treat a quantity of granules with a predetermined excessive amount of vitamins and minerals and to appropriately dilute or intermix the treated granules with a larger quantity of untreated cereal product. For example, it is common practice to provide enriched granules containing sufficient vitamins and minerals so that the enriched granules can be employed together with 200 to 400 times the quantity of untreated cereal product in forming a final product having a vitamin and mineral content approximately that of whole, unrefined grain, i. e., rice, corn, wheat, or the like.

Unfortunately, the enriching agents, and particularly certain iron compounds such as iron phosphate, and certain vitamins such as riboflavin, tend to impart color to the enriched granules, and the enriched granules have a noticeable yellowish color when mixed with untreated granules. This color contrast is objectionable in the case of rice particularly since the treated granules have an appearance similar to that of the so-called "scorched" rice; i. e. rice which has been harvested when wet and which upon drying takes on a yellowish to brownish color. Among rice-eating peoples the discoloration of the "scorched" rice is considered to indicate an inferior and undesirable product. Due to the unfortunate similarity between "scorched" rice and the enriched rice granules heretofore available, the introduction of enriched rice as heretofore available has met with considerable resistance among the rice-eating peoples. The color contrast above mentioned is equally noticeable, and likewise objectionable from the standpoint of consumer appeal, in the case of other enriched cereal products such as hominy grits, farina, and the like.

I have now discovered a procedure whereby enriched cereal granules can be further treated to impart to the enriched granules a color substantially indistinguishable from that of white unenriched granules while, at the same time, in no way interfering with or impairing the enriching agents. Regarded in certain of its broader aspects, my invention comprises a white coated, enriched granular cereal and the process for preparing the same by applying an organic solvent solution of an essentially water-insoluble coating agent to a mass of enriched cereal granules while tumbling the same, dusting the moist granules with a powdered whitening agent and continuing to tumble the same until organic solvents are substantially removed, and repeating the applications of film forming agent and whitening agent to build up on the granules an outer coating of progressively increasing opacity and whiteness thereby to obtain coated enriched granules having a color and appearance substantially the same as white unenriched granules.

The alternate application of the film forming agent in organic solvent solution and the dry powdered whitening agent appears to be essential to provide uniform and durable white coatings on enriched cereal granules. In this connection it should be noted that attempts to suspend whitening agent in the film forming solution and apply this suspension to the enriched granules has not proved to be satisfactory since the latter method of application yields a non-uniform coating and one which tends to chip off, leaving exposed portions of yellow colored enriched granules.

The film forming agent should be one which is insoluble, or very slightly soluble in water, so that the treated granules can be subjected to washing or rinsing without loss of the white coating. While various film forming agents can be employed, I have found that very satisfactory results are obtained with zein when applied in the form of an aqueous acetone solution and with shellac of the type commonly referred to as "pharmaceutical glaze." Both of these materials are recognized to be non-deleterious and are utilized quite extensively in pharmaceutical and food products.

Many organic and inorganic substances which are non-toxic and eatable can be employed as whitening agent in my process. A primary requirement, of course, is that the whitening agent have properties such that application in the manner herein disclosed will effectively mask or conceal the yellow color of enriched cereal granules so that these granules have the appearance of ordinary unenriched granules. Some of the preferable whitening agents are tricalcium phosphate, magnesium carbonate, magnesium oxide and talc. Of these, the tricalcium phosphate is considered preferable due to the fact that it provides good whitening properties and gives a coat which is very resistant to rinsing or washing and, at the same time, is a substance furnishing calcium in an assimilable form and is widely acceptable for use in foods. Furthermore white coated granules containing calcium phosphate in the coating present a very hard surface which does not tend to chip or flake off.

In carrying out my process, enriched cereal granules having a characteristic yellowish color are placed in a coating or tumbling pan preferably maintained at a moderately elevated temperature, i. e. about 30° C. While rotating the pan to tumble the granules, a quantity of organic solvent solution of coating agent is added and tumbling continued to distribute the coating material over the mass of granules. The powdered whitening agent is then added as tumbling is continued and the whitening agent becomes spread as a very thin film or deposit over the still moist or tacky surface of the granules. The tumbling is continued until the granules have become quite dry through evaporation of the organic solvent, and then additional successive application of film forming agent and whitening agent are made.

If desired, the film forming agent and/or the whitening agent can be changed or modified from one coating to another. Thus, for example, effective white coatings have been obtained by making five applications of tricalcium phosphate with shellac as the binder, followed by five coats of tricalcium phosphate with zein dissolved in aqueous acetone as the binder. A final outer coating in which talc is applied with a suitable binder is advantageous as a means for facilitating the formation of highly polished white coated granules.

Even with a relatively large number of separate applications of whitening agent, the individual applications or coatings are so thin that the aggregate or combined coating does not appreciably change the size and shape of the granules. In general, the aggregate weight of whitening agent required to provide an effective white coating will not exceed about five to seven per cent by weight based upon the weight of the enriched granules prior to the white coating.

The following examples will serve to show details of typical procedure for white-coating enriched cereal granules in accordance with my invention, but it is to be understood that these examples are given by way of illustration and not of limitation.

*Example 1*

The enrichment and white coating of a 200-lb. batch (77,130 g.) of white polished rice involves the use of the following materials:

| | | |
|---|---|---|
| Niacin | g | 705 |
| Thiamine hydrochloride | g | 99 |
| Ferric phosphate | g | 2,290 |
| Calcium phosphate, tribasic | g | 7,300 |
| Zein | g | 1,720 |
| Talc, purified | g | 400 |
| Pharmaceutical glaze, 4-lb. cut | cc | 3,840 |
| Acetone | cc | 21,700 |
| Water | cc | 5,000 |
| Rice, California pearl type | g | 77,130 |

First, prepare a coating solution by dissolving the zein in a mixture of the acetone and the water. The volume of the resulting zein solution is about 28,000 cc.

Mix the niacin with 1,300 cc. of zein solution and stir until a smooth paste is formed. Dilute this paste with 16,200 cc. of zein solution, and with mechanical stirring add successively the thiamine hydrochloride and ferric phosphate. Stir until a smooth suspension is formed.

Charge a warm coating pan with the rice, start the pan rotating, and pour the above suspension over the tumbling rice in 1500–2000 cc. portions. The pour should take about two minutes. Allow five to ten minutes for drying between each addition. When all the zein suspension has been added, use about 3×1000 cc. of the remaining clear zein solution to rinse out the equipment used in the preparation of the suspension. Add the rinse to the coated rice. Allow the coated rice to tumble for 15 to 20 minutes for drying purposes.

Meanwhile, measure out about 748 cc. of 4-lb. cut pharmaceutical glaze and pour this over the tumbling rice. Allow the tumbling rice to become "wet" with the shellac (15 to 20 seconds) and then powder on 730 g. of calcium phosphate, tribasic. Allow the partially "whitened" rice to tumble 5 to 10 minutes and then repeat the procedure until a total of 3650 g. of calcium phosphate, tribasic has been added. Keep the rice tumbling for 20 to 30 minutes before starting the next step.

Measure out about 1,750 cc. of zein solution, pour over tumbling rice and powder on 730 g. of calcium phosphate, tri-basic. Repeat this operation a total of five times allowing 5 to 10 minutes for drying purposes between each application.

Finally, pour the last 1,750 cc. of clear zein solution on the tumbling rice and add the 400 g. of talc. Tumble for 20 to 30 minutes before discharging.

The "white coated" and fortified rice produced by this process should be free-flowing and free of agglomerates. It should be allowed to dry or age at room temperature for at least 24 hours in layers about six inches deep. This will allow the pharmaceutical glaze to harden and the moisture content of the rice to reach equilibrium with the moisture in the air around it.

Each pound of rice so enriched contains approximately 440 mg. thiamine hydrochloride, 3200 mg. niacin, and 2600 mg. of iron (derived from approximately 10.5 g. of ferric phosphate or ferric pyrophosphate). When one lb. of this fortified rice is blended with 199 lbs. of unfortified rice, a fortified product is produced which when a normal daily quantity of enriched rice is consumed will supply the daily requirements of these micro nutrients.

*Example 2*

The procedure of Example 1 is followed in every detail including, in addition to the other vitamins and minerals, 39 g. of riboflavin which is dissolved with the other vitamins and minerals in the 16,200 cc. solution employed for applying the enrichment coating. Although the presence of riboflavin imparts additional color to the vitamin enriched granules, this color is completely masked by the application of white coatings as described in Example 1.

*Example 3*

In the enrichment and white coating of hominy grits the following materials are used to prepare a 200 lb. batch, final weight:

| | | |
|---|---|---|
| Hominy grits (all thru 14-mesh) | lbs | 143 |
| Calcium phosphate, tribasic | g | 9,700 |
| Thiamine hydrochloride | g | 340 |
| Riboflavin | g | 210 |
| Niacin | g | 2,350 |
| Ferric phosphate | g | 7,250 |
| Zein | g | 1,625 |
| Pharmaceutical glaze, 4-lb. cut | ml | 14,550 |
| Ethanol | ml | 3,000 |
| Acetone | ml | 20,800 |
| Water | ml | 5,325 |

The 4,500 ml. of 4-lb. cut pharmaceutical glaze is placed in a suitable agitator equipped vessel and 3,000 ml. of ethanol added with stirring. To the thinned glaze is added 340 g. of thiamine hydrochloride, 210 g. of riboflavin, and 2,350 g. of niacin. After mixing for 5 minutes, 2,000 ml. of the suspension is poured over 143 lbs. of hominy grits in a coating pan and tumbling continued for 10 minutes, allowing the coat to dry. The procedure is repeated until the suspension has all been added to the hominy grits. The hominy grits are then allowed to tumble until dry, 10 minutes being usually sufficient.

A solution of 1,625 g. of zein in a mixture containing 20,800 ml. of acetone and 5,325 ml. of water is prepared, and 7,250 g. of ferric phosphate added thereto. After mixing well, the suspension is poured over the tumbling hominy grits in 6,000 ml. quantities, allowing 10 minutes for drying between additions. The damp grits are then dried for 6 hours at 40–45° C.

To 180 lb. of hominy grits, enriched by the above-described process, in a coating pan is added 3,350 ml. of 4-lb. cut pharmaceutical glaze during 30–45 seconds. The hominy grits are allowed to tumble an additional 30–45 seconds and 1,800 g. of calcium phosphate, tribasic, is sprinkled on over 30–36 seconds. The partially whitened grits are allowed to tumble 5 minutes. The process is repeated twice using 3,350 ml. of glaze and about 4,000 g. of calcium phosphate, tribasic. After the coating is complete, the tumbling is continued 15–20 minutes and the hominy grits discharged into trays for drying. The drying time is 5 hours at 40–45° C.

Each pound of whitened, enriched hominy grits contains:

| | |
|---|---|
| Thiamine hydrochloride_____g__ | 1.52 |
| Riboflavin _____g__ | 0.96 |
| Niacin _____g__ | 11.20 |
| Iron _____g__ | 8.80 |

A solution of zein in a mixture of acetone and water may be used in place of an ethanolic solution of pharmaceutical glaze to bind the whitening agent to the enriched grain, hominy grits, in this specific example.

The enriched hominy grits prepared as described above can be mixed with unenriched hominy grits in the proportions of 1 part enriched to 400—600 parts unenriched grits in preparing end products which are suitably fortified with vitamins and minerals.

The procedures described in the foregoing examples can in like manner be employed for the white coating of farina and other granular cereal products.

While the foregoing examples describe an overall procedure for enriching cereal granules and then white-coating the enriched granules, it will be understood that the enrichment and white-coating steps are independent procedures and that my invention is concerned solely with the step of white-coating granules which have already been treated for vitamin enrichment.

A distinctive feature or characteristic of the white coating applied to cereal granules in accordance with my invention is the built-up or laminated nature of the white coating. If viewed microscopically in cross-section, the aggregate white coating would appear as a series of continuous films of zein, shellac or other coating agent separated by zones or laminations wherein the film of coating agent contains particles of the finely divided whitening agent which adhered thereto as the individual films dried. The superiority of my white coated, enriched cereal granules, from the standpoint of resistance to rinsing and cracking or chipping of the coating, is believed to be due in large part to this characteristic laminated nature of the several layers making up the aggregate white coating.

Various changes and modifications in the procedures herein disclosed will occur to those skilled in the art, and to the extent that such changes and modifications are embraced by the appended claims, it is to be understood that they constitute part of my invention.

I claim:

1. The process for preparing white coated, enriched cereal granules that comprises applying an organic solvent solution of an essentially water-insoluble coating agent to a mass of enriched granules while tumbling the same, dusting the moist granules with a powdered whitening agent and continuing to tumble the same until the solvents are substantially removed, and repeating the applications of film forming agent and whitening agent to build up on the granules an outer coating of progressively increasing opacity and whiteness thereby to obtain coated enriched granules having a color and appearance substantially the same as white unenriched cereal granules.

2. The process as defined in claim 1 wherein the coating agent is shellac.

3. The process as defined in claim 1 wherein the whitening agent is tricalcium phosphate.

4. The process as defined in claim 1 wherein the whitening agent is talc.

5. The process as defined in claim 1 wherein inner applications of whitening agent comprise tricalcium phosphate and outer applications of whitening agent comprise talc.

6. The process that comprises moistening a quantity of vitamin enriched cereal granules, while tumbling the same with a coating material comprising zein in aqueous acetone solution, adding to the moist granules, while continuing to tumble the same, finely divided tricalcium phosphate in an amount to provide a thin deposit thereof on the granules, continuing to tumble the granules thus coated until they become substantially dry, and then applying successive additional quantities of zein solution and tricalcium phosphate with intermittent drying to build up a coating of progressively increasing opacity and whiteness thereby to form a product having color and appearance substantially the same as white unenriched cereal granules.

7. A vitamin enriched granular cereal product wherein individual cereal granules having a coating containing vitamin and mineral enriching agents are provided with an outer white coating imparting to the granules a color and appearance substantially the same as white unenriched granules, said outer coating comprising a plurality of enveloping films of coating material, and each film having embedded in the outer portion thereof particles of finely divided whitening agent.

8. A vitamin enriched granular cereal product wherein individual cereal granules having a coating containing vitamin and mineral enriching agents are provided with an outer white coating imparting to the granules a color and appearance substantially the same as white unenriched granules, said outer coating comprising a plurality of enveloping films of zein, and each film having embedded in the outer portion thereof particles of finely divided whitening agent.

9. A vitamin enriched granular cereal product wherein individual cereal granules having a coating containing vitamin and mineral enriching agents are provided with an outer white coating imparting to the granules a color and appearance substantially the same as white unenriched granules, said outer coating comprising a plurality of enveloping films of coating material, and each film having embedded in the outer portion thereof particles of finely divided tricalcium phosphate as a whitening agent.

10. A vitamin enriched granular cereal product wherein individual cereal granules having a coating containing vitamin and mineral enriching agents are provided with an outer white coating imparting to the granules a color and appearance substantially the same as white unenriched granules, said outer coating comprising a plurality of enveloping films of zein, and each film having embedded in the outer portion thereof particles of finely divided tricalcium phosphate as a whitening agent.

11. A white coated granular cereal product wherein individual cereal granules have an outer coating comprising a plurality of enveloping films of coating material, and each film having embedded in the outer portion thereof particles of finely divided whitening agent.

12. White coated rice wherein individual rice granules have an outer coating comprising a plurality of enveloping films of coating material, and each film having embedded in the outer portion thereof particles of finely divided whitening agent.

13. White coated hominy grits wherein individual granules thereof have an outer coating comprising a plurality of enveloping films of coating material, and each film having embedded in the outer portion thereof particles of finely divided whitening agent.

14. White coated farina wherein individual granules thereof have an outer coating comprising a plurality of enveloping films of coating material, and each film having embedded in the outer portion thereof particles of finely divided whitening agent.

15. A vitamin enriched granular cereal product wherein individual cereal granules having a coating containing vitamin and mineral enriching agents are provided with an outer white coating imparting to the granules a color and appearance substantially the same as white unenriched granules, said outer coating comprising a plurality of enveloping films of shellac, and each film having embedded in the outer portion thereof particles of finely divided whitening agent.

16. A vitamin enriched granular cereal product wherein individual cereal granules having a coating containing vitamin and mineral enriching agents are provided with an outer white coating imparting to the granules a color and appearance substantially the same as white unenriched granules, said outer coating comprising a plurality of enveloping films of shellac, and each film having embedded in the outer portion thereof particles of finely divided tricalcium phosphate as a whitening agent.

17. White coated hominy grits wherein individual granules thereof have an outer coating comprising a plurality of enveloping films of shellac, and each film having embedded in the outer portion thereof particles of finely divided tricalcium phosphate as a whitening agent.

References Cited in the file of this patent

UNITED STATES PATENTS

| | | |
|---|---|---|
| 576,860 | Lanaux | Feb. 9, 1897 |
| 2,166,797 | Collatz | July 18, 1939 |
| 2,381,343 | Furter | Aug. 7, 1945 |
| 2,508,477 | Stievater | May 23, 1950 |